United States Patent [19]

MacHesney et al.

[11] Patent Number: 5,828,349

[45] Date of Patent: Oct. 27, 1998

[54] METHOD AND SYSTEM FOR MULTIPLEXING AND DEMULTIPLEXING VIDEO SIGNALS FOR GRAPHIC DISPLAY MONITORS IN COMPUTER SYSTEMS

[75] Inventors: Brian John MacHesney, Burlington; Roderick Michael Peters West, Colchester, both of Vt.

[73] Assignee: International Business Machines Corporation, Armonk, N.Y.

[21] Appl. No.: 706,620

[22] Filed: Sep. 6, 1996

[51] Int. Cl.[6] .................................................. G09G 5/00
[52] U.S. Cl. ................................. 345/3; 345/153; 345/155
[58] Field of Search ................................. 345/3, 153, 155; 358/310, 703; 340/825.62; 395/889; 327/403, 407; 375/257, 535; 241/126, 141, 110

[56] References Cited

U.S. PATENT DOCUMENTS

| 4,646,165 | 2/1987 | Hirota ....................................... 358/310 |
| 4,734,759 | 3/1988 | Kobori et al. ............................. 358/75 |
| 5,276,436 | 1/1994 | Shaw et al. ............................... 340/703 |
| 5,499,036 | 3/1996 | Hauck ....................................... 345/3 |
| 5,515,068 | 5/1996 | Uragami ..................................... 345/3 |
| 5,608,532 | 3/1997 | Park .......................................... 386/7 |
| 5,673,058 | 9/1997 | Uragami et al. ........................... 345/3 |
| 5,673,065 | 9/1997 | Deleeuw ................................... 345/153 |

*Primary Examiner*—Richard A. Hjerpe
*Assistant Examiner*—Ronald Laneau
*Attorney, Agent, or Firm*—Calfee, Halter & Griswold LLP

[57] ABSTRACT

A computer graphics and display system is provided, comprising (i) a graphics system for outputting a first plurality of digital color signals; (ii) a first digital-to-analog converter (DAC) for converting the first plurality of digital color signals into a second plurality of analog color signals, the second plurality being less in number than the first plurality; (iii) a first analog-to-digital converter (ADC) for reconverting the second plurality of analog color signals back to the first plurality of digital color signals; and (iv) an LCD display device for receiving the reconverted first plurality of digital color signals. The first and second DACs and the first and second ADCs are implemented within the same integrated circuit (IC) chip. The first plurality of digital color signals comprises red, blue and green even pixels and red, blue and green odd pixels. Each color for both even and odd pixels is encoded onto a single pair of the first DACs by interleaving same color pixels onto the single pair.

20 Claims, 5 Drawing Sheets

METHOD AND SYSTEM FOR MULTIPLEXING AND DEMULTIPLEXING VIDEO SIGNALS FOR GRAPHIC DISPLAY MONITORS IN COMPUTER SYSTEMS

FIELD OF THE INVENTION

The present invention relates generally to computer graphics and display systems, and more particularly to a digital-to-analog (D/A) and analog-to-digital (A/D) system for converting and transmitting digital video signals for display on a computer display device.

BACKGROUND OF THE INVENTION

In computer systems, display devices such as LCD (liquid crystal display) or CRT (cathode ray tube) monitors are used to display text and graphic material to a user. FIG. 1 shows a typical CRT computer system 10 and FIG. 2 shows a typical LCD computer system 40.

As shown in FIG. 1, the CRT computer system 10 comprises a computer graphics system 12 and a CRT monitor 14. The computer graphics system 12 comprises a graphics controller 16, a frame buffer 18, and a palette/digital-to-analog conversion (DAC) circuit 20.

The palette/DAC conversion circuit 20 comprises a demultiplexer 22, format logic 24, a palette memory 26, and three digital-to-analog converters (DACs) 28a–c.

The graphics controller 16 provides synchronization signals 29a and 29b to the palette/DAC conversion circuit 20, and controls the operation of the frame buffer 18 which serves as the graphics memory. Information stored in the frame buffer 18 is processed by the palette/DAC conversion circuit 20 and output to the CRT monitor 14. The demultiplexer 22 demultiplexes the multiplexed digital output of the frame buffer 18, the format logic 24 formats the demultiplexed signals for the palette memory 26, and the DACs 28a–c output blue, green and red analog video signals 30a–c, respectively, to the CRT monitor 14.

The analog video signals 30a–30c each comprise an analog signal representing 8 digital data bits. Because the 8-bit binary signal can represent $2^8$ or 256 values, the analog signal may assume any of a possible 256 analog voltage levels. Assuming a 1 volt analog signal, the difference between voltage levels is only 1 volt/256 levels or 3.9 millivolts (mV).

As used herein, "digital" means a signal which is binary in nature, assuming either of two states. "Analog" means a signal which may take on at least two different values. Both the digital and analog signals discussed herein, however, are time-discrete, rather than time-continuous, in nature.

HSYNC (horizontal synchronization) and VSYNC (vertical synchronization) signals, 32 and 34 respectively, as well as monitor identifier lines 36a–36d, also connect the palette/DAC conversion circuit 20 to the CRT monitor 14. The standard interface between the CRT monitor 14 and the computer graphics system 12, for most personal computers and some workstations, is a standard monitor cable attached at either end to the graphics system 12 and the CRT monitor 14 by a 15 pin "D-shell" connector. Accordingly, as shown in FIG. 1, 9 of the available 15 lines on the connector are used in the CRT computer system 10. Although a "D-shell" connector is described as connecting the graphics system 12 to the CRT monitor 14 in connection with FIG. 1, and also as the interconnection medium in FIGS. 2, 3 and 5, any suitable interconnection medium for connecting graphics systems to monitors is contemplated by the present invention.

As shown in FIG. 2, the LCD computer system 40 comprises a computer graphics system 42 and an LCD monitor 44. The computer graphics system 42 comprises a graphics controller 46, a frame buffer 48, and a palette/transformation circuit 50. The palette/transformation circuit 50 comprises a demultiplexer 52, format logic 54, a palette memory 56, and a transform circuit 58.

As in the CRT computer system 10 described above, the graphics controller 46 provides synchronization signals 59a and 59b to the palette/transformation circuit 50, and controls the operation of the frame buffer 48 which serves as the graphics memory. Information stored in the frame buffer 48 is processed by the palette/transformation circuit 50 and output to the LCD monitor 44. The demultiplexer 52 demultiplexes the multiplexed digital output of the frame buffer 48, and the format logic 54 formats the demultiplexed signals for the palette memory 56. However, unlike the CRT computer system 10 of FIG. 1, wherein the digital signal is converted to an analog signal at this point, at the transform circuit 58, the signal undergoes certain digital transformations and is communicated directly to the LCD monitor 44 over as many as forty-eight digital color signals 60.

The large number of digital color signals 60 is required because current LCD monitors can display 3–4 bits per color (red, blue and green) and thus require 9 or 12 bits of digital display for each display pixel. Soon LCD monitors which can display 6 or 8 bits per color will be available, thereby requiring 18 or 24 bits of digital display for each display pixel. Moreover, most LCD monitors require the simultaneous presentation of two pixels (even and odd), effectively doubling the number of bits (36 or 48) required for each display pixel. Still further, digital display synchronization signals (HSYNC line 62, VSYNC line 64, clock line 66, and DSPTMG (display timing) line 68) also connect the palette/transformation circuit 50 to the LCD monitor 44. Thus, up to 52 lines are needed to connect the palette/transformation circuit 50 to the LCD monitor 44.

Accordingly, it is an object of the present invention to provide a standardized digital-to-analog and analog-to-digital conversion and transmission system which may be applied to either a CRT or LCD computer graphics system, to simultaneously reduce the required number of communications channels between the graphics system and either the LCD or CRT monitor, while improving the performance of the communications channels. In addition, it is an object of the present invention to provide such a system which will facilitate easy replacement of a CRT monitor with an LCD monitor. It is a still further object of the present invention to provide a standard interface between LCD monitors and computer graphics systems, in much the same manner as the 15 pin "D-shell" connector is the standard in the CRT environment.

SUMMARY OF THE INVENTION

A computer graphics and display system is provided, comprising (i) a graphics system for outputting a first plurality of digital color signals; (ii) a first digital-to-analog converter (DAC) for converting the first plurality of digital color signals into a second plurality of analog color signals, the second plurality being less in number than the first plurality; (iii) a first analog-to-digital converter (ADC) for reconverting the second plurality of analog color signals back to the first plurality of digital color signals; and (iv) an LCD display device for receiving the reconverted first plurality of digital color signals.

The graphics system also outputs a third plurality of digital display synchronization signals, including a horizontal synchronization signal, a vertical synchronization signal, a display timing signal, and a clock signal. A second DAC converts the third plurality of digital display synchronization signals into a single analog synchronization signal. A second ADC reconverts the single analog synchronization signal back to the third plurality of digital display synchronization signals.

The first and second DACs and the first and second ADCs are preferably implemented within the same integrated circuit (IC) chip. The first plurality of digital color signals comprises red, blue and green even pixels and red, blue and green odd pixels. Each color for both even and odd pixels is encoded onto a single pair of the first DACs by interleaving same color pixels onto the single pair.

DETAILED DESCRIPTION OF THE PREFERRED EMBODIMENT

The present invention provides a system and method for efficient handling of video signals between a computer graphics system and an attached LCD monitor, by providing an efficient interface between the computer graphics system and the LCD monitor. The interface also permits interchangeability of LCD monitors with CRT monitors, and permits these devices to be connected to the graphics system by a considerable length of cable. The invention is implemented in hardware form within DAC and ADC circuitry at the graphics system end, or within video electronics at the monitor end of the system.

Figure 2:
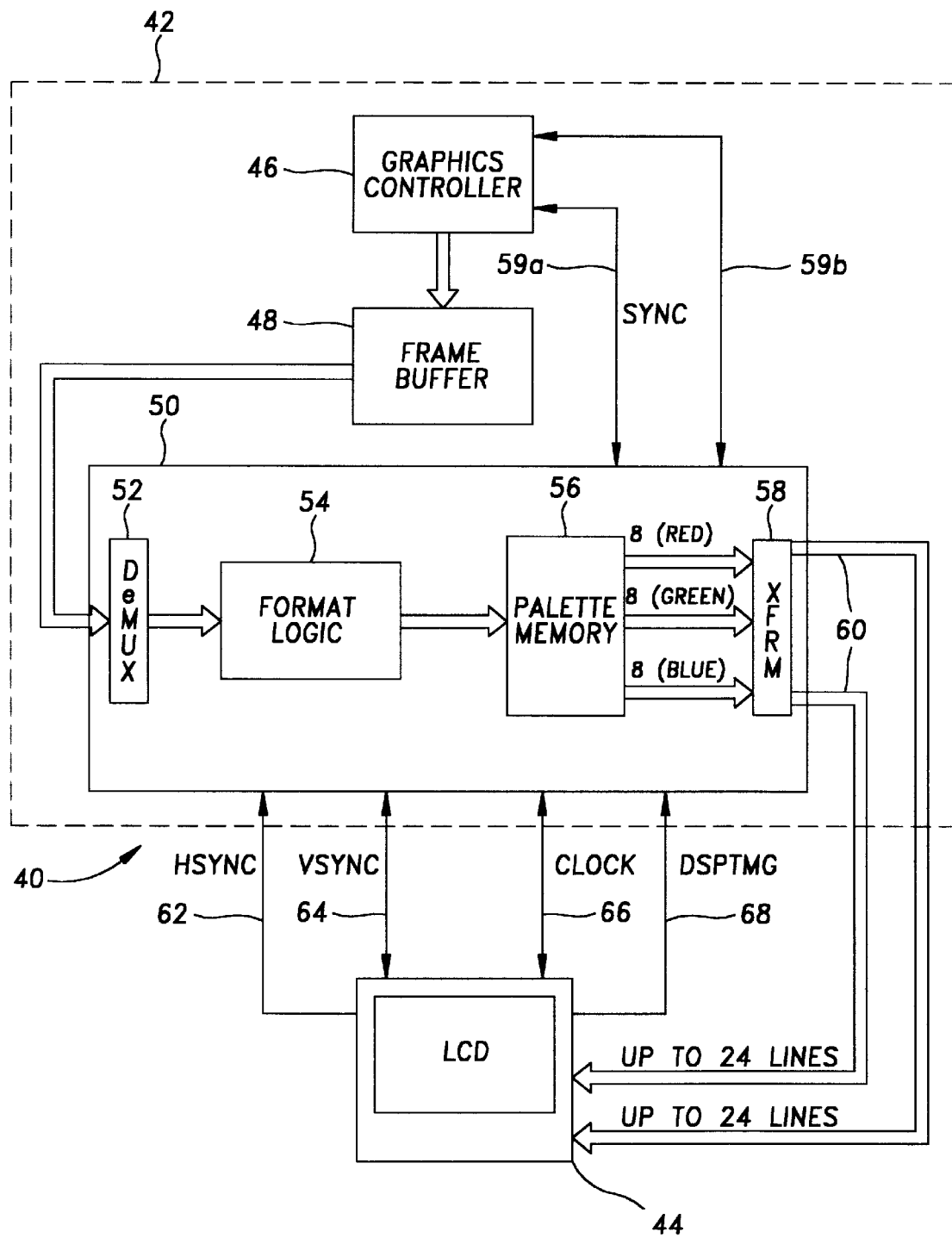
FIG. 2 is a schematic block diagram of a typical LCD computer system 40.
Figure 3:
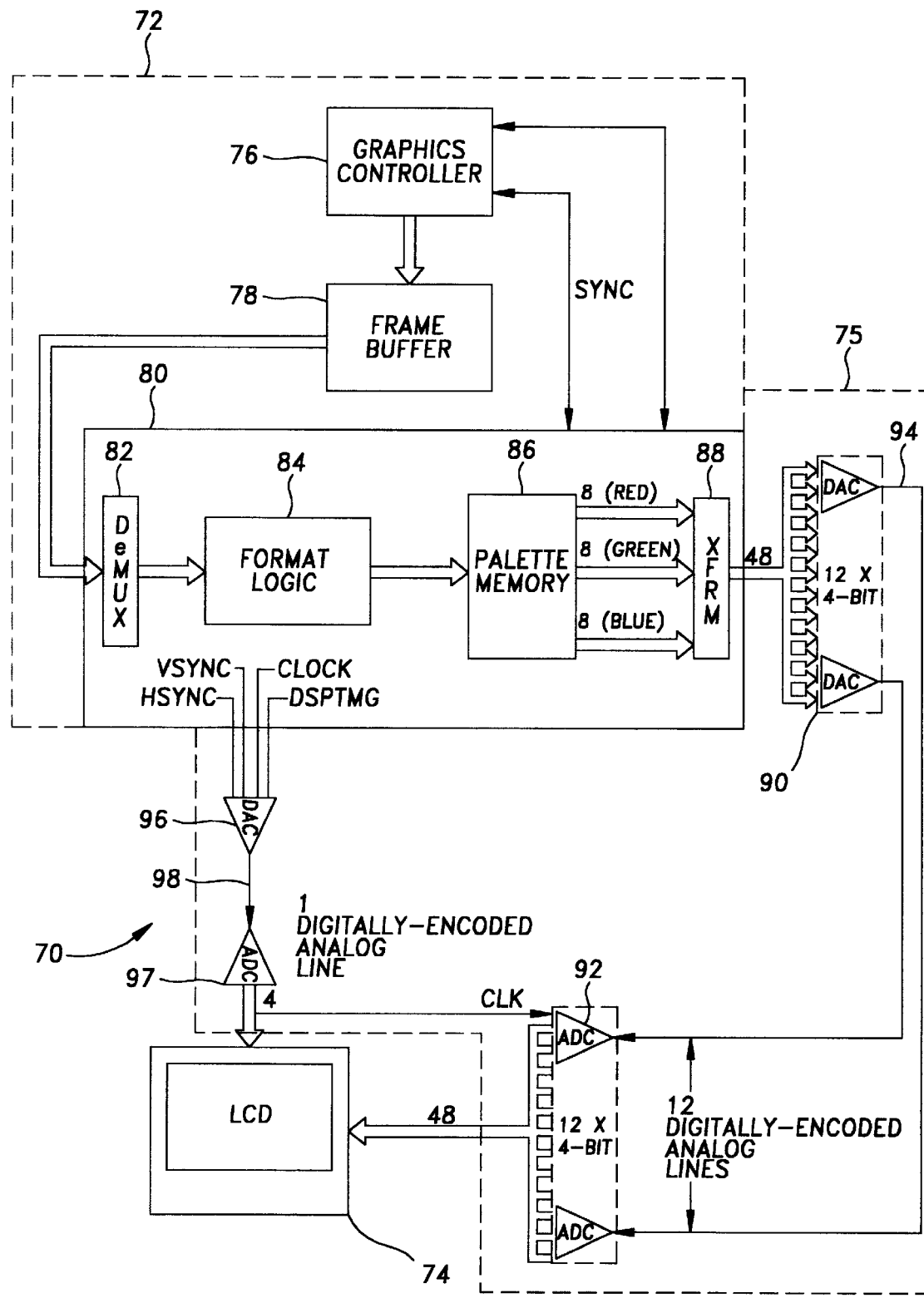
FIG. 3 is a first embodiment of the present invention.

A first embodiment of an LCD system 70 constructed according to the principles of the present invention is shown in FIG. 3. Similar to the system shown in FIG. 2, the system 70 includes a computer graphics system 72 and an LCD monitor 74 (identical and therefore interchangeable with the LCD monitor 44 of FIG. 2). Unlike the systems shown in FIG. 2, however, the system 70 of FIG. 3 includes an interface 75 connecting the graphics system 72 with the LCD monitor 74.

The computer graphics system 72 comprises a graphics controller 76, a frame buffer 78, and a palette/transformation circuit 80. The palette/transformation circuit 80 comprises a demultiplexer 82, format logic 84, a palette memory 86, and a transform circuit 88. The demultiplexer 82, format logic 84, palette memory 86 and transform circuit 88 are similar to those corresponding circuit elements shown in FIG. 2 in connection with known LCD computer graphics systems. The input to both of the demultiplexers (52 in FIG. 2 and 82 in FIG. 3) is the output of a graphics memory frame buffer, and the output of both of the transformation circuits (58 in FIG. 2 and 88 in FIG. 3) is a 48 bit digital color video signal.

The interface 75 includes a first digital/analog converter (DAC) 90 and a first analog/digital converter (ADC) 92 connected by a connector having lines for carrying color signals 94. The interface 75 also includes a second digital/analog converter (DAC) 96 and a second analog/digital converter (ADC) 97 connected by connector having a line for carrying a display synchronization signal 98. The computer graphics system 72 connects to the first and second DACs 90 and 96, and the LCD monitor 74 connects to the first and second ADCs 92 and 97.

Figure 4:
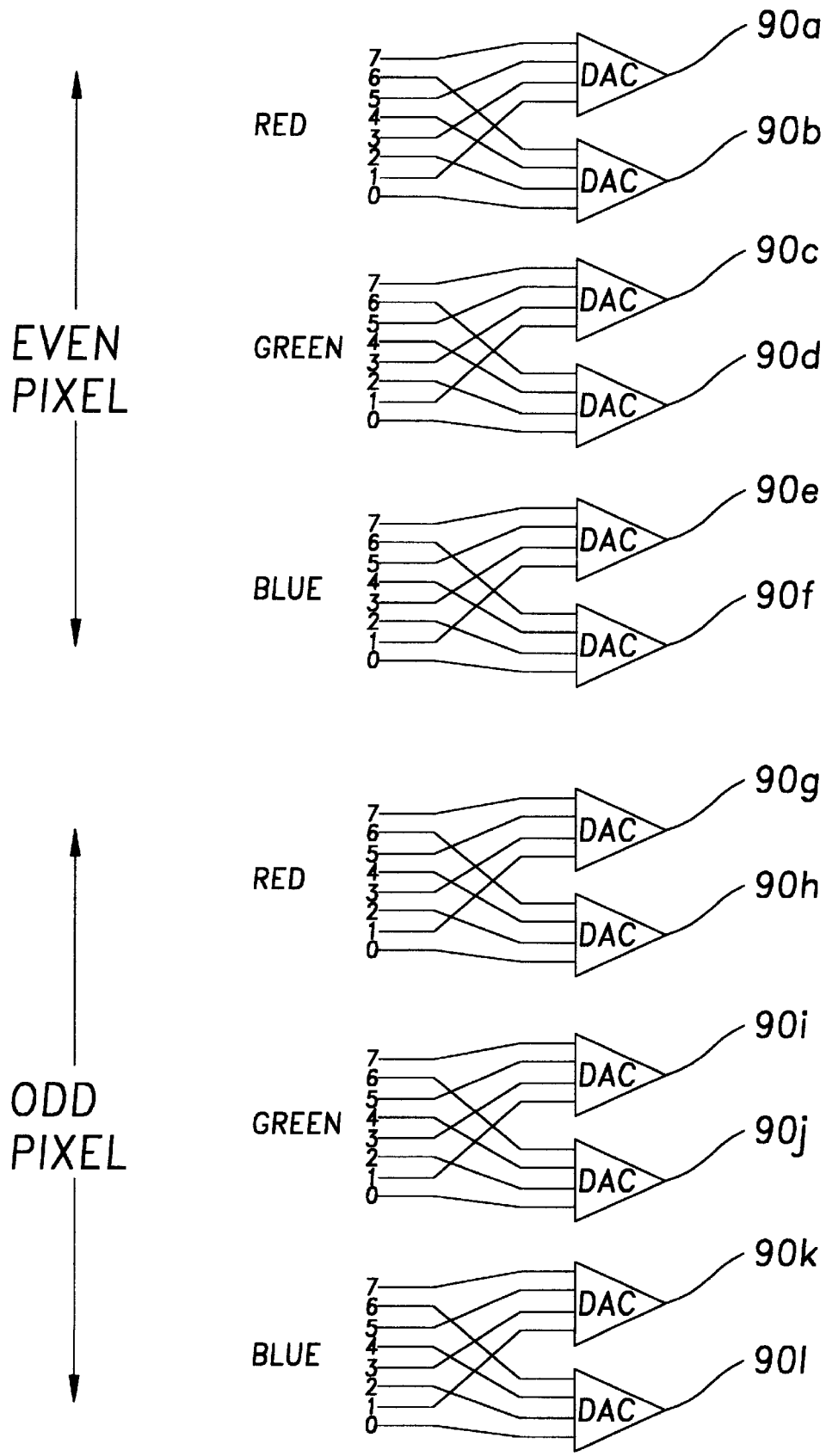
FIG. 4 is a more detailed schematic of the digital-to-analog conversion (DAC) circuit of the system of FIG. 3.

The digital/analog converter 90 (which is actually twelve individual DACs 90a–90l as shown in FIG. 4) reduces the number of color signals from 48 to 12 by arranging the 48 digital signals into twelve groups of four digital signals, and then by encoding each of the four-bit groups onto a separate analog signal 94 by means of the twelve DACs 90. Each of the twelve analog video signals 94 comprise an analog signal representing 4 digital data bits.

The choice of grouping by four provides excellent noise immunity. Analog noise on the data lines connecting the LCD monitor 74 to the palette/transformation circuit 80 can cause a loss of data if the noise obfuscates the differences in analog voltage values on the lines. Because each of the 4-bit binary signals 94 can represent $2^4$ or 16 values, the analog signal may assume any of a possible 16 analog voltage levels. Assuming a 1 volt analog signal, the difference between voltage levels is 1 volt/16 levels or 62.5 millivolts (mV).

Compared to the LCD system of FIG. 2, wherein the difference between voltage levels is a mere 3.9 millivolts (mV), the inventive system of FIG. 3 provides significantly enhanced noise immunity. Thus, the twelve analog video signals 94, being somewhat immune to noise, may cover a considerable distance between the palette/transformation circuit 80 and the LCD monitor 74. Moreover, reducing the number of lines connecting the palette/transformation circuit 80 and the LCD monitor 74 reduces the overall complexity and cost of the system 70.

Figure 1:
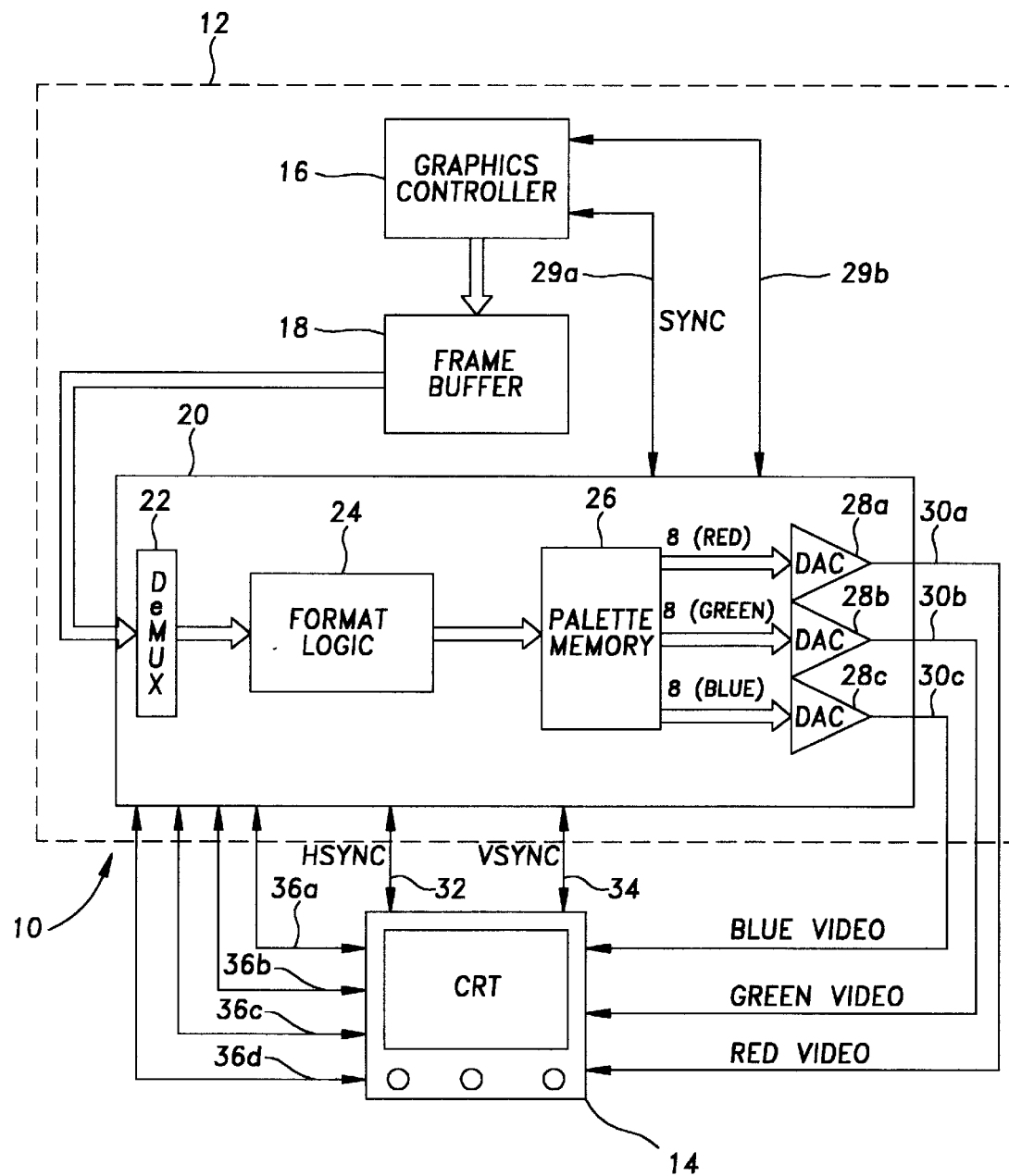
FIG. 1 is a schematic block diagram of a typical CRT computer system 10.

In addition to providing enhanced noise immunity, the grouping of four digital data bits enables the use of 4-bit DACs 90, which cost significantly less than the 8-bit DACs 28a–c shown in the CRT system of FIG. 1. Of course, the disclosed technique of encoding groups of four digital signals onto a single analog signal line is meant to be only exemplary. As increases in the numbers of bits used to represent colors occur, commensurate semiconductor technology advances will enable groups of more than four signals to be cost-effectively encoded onto a single analog signal 94.

The complementary analog-to-digital converters (ADCs) 92 are used to reconstruct the original digital information. The twelve digitally encoded analog signals are converted back to the original 48 digital data signals. Thus, twelve digitally encoded analog signal lines may be used to connect the LCD monitor 74 with the palette/transformation circuit 80, instead of the 48 signal lines shown in FIG. 2.

The four digital display synchronization signals (HSYNC line 62, VSYNC line 64, clock line 66, and DSPTMG (display timing) line 68) are similarly encoded onto a single analog signal 98 by DAC 96. The complementary analog-to-digital converter (ADC) 97 is used to reconstruct the original digital information provided by the digital display synchronization signals. The single digitally encoded analog signal 98 is converted back to the original 4 digital synchronization signals. Thus, a single digitally encoded analog signal line may be used to connect the synchronization lines of the LCD monitor 74 with the palette/transformation circuit 80, instead of the 4 lines shown in FIG. 2.

The digital-to-analog encoding onto signals 94 and 98 is accomplished as shown in FIG. 4. As explained above, most LCD monitors require the simultaneous presentation of even and odd pixels for each display pixel. In the case of LCD monitors which can display 8 bits per color, 48 bits of digital display for each display pixel is required, as shown in FIG. 4.

Each color for both the even and odd pixels is encoded onto a pair of DACs. With 8 bits per color (red, blue and green), the four odd bits (bits 7, 5, 3 and 1) for each color are encoded by one DAC of the pair onto one analog signal line as $2^4$ or 16 analog voltage values. The most significant odd bit (bit 7) is encoded as the most significant bit on the first DAC of the pair. The four even bits (bits 6, 4, 2 and 0) are similarly encoded onto the second DAC in the pair, with the most significant even bit (bit 6) encoded as the most significant bit on the DAC. This manner of interleaving the data bits onto the inputs of the DACs 90a–90l continues until the last bit to be encoded for each color for both the even and odd pixels (bit 0) is encoded onto the second DAC of each pair of DACs.

The digital display synchronization signals (HSYNC, VSYNC, clock, and DSPTMG) are similarly encoded onto the single DAC 96, with the clock signal encoded as the most significant bit. This encoding technique minimizes the probability that the more significant bits (7, 6, 5, 4) may be lost due to mismatches between DAC 90 and ADC 92, or between DAC 96 and ADC 97, by providing the minimum effect possible from the loss of the least significant bit on either of digitally encoded analog signals 94 or 98.

Efficient encoding techniques are thereby provided by the present invention. For example, because 4-bit DACs and 4-bit ADCs are used to encode/decode both the video data signals and the synchronization signals, both the video data and synchronization signals may be encoded/decoded by converters (DACs and ADCs) implemented within the same integrated circuit (IC) chip to maximize device efficiency.

Figure 5:
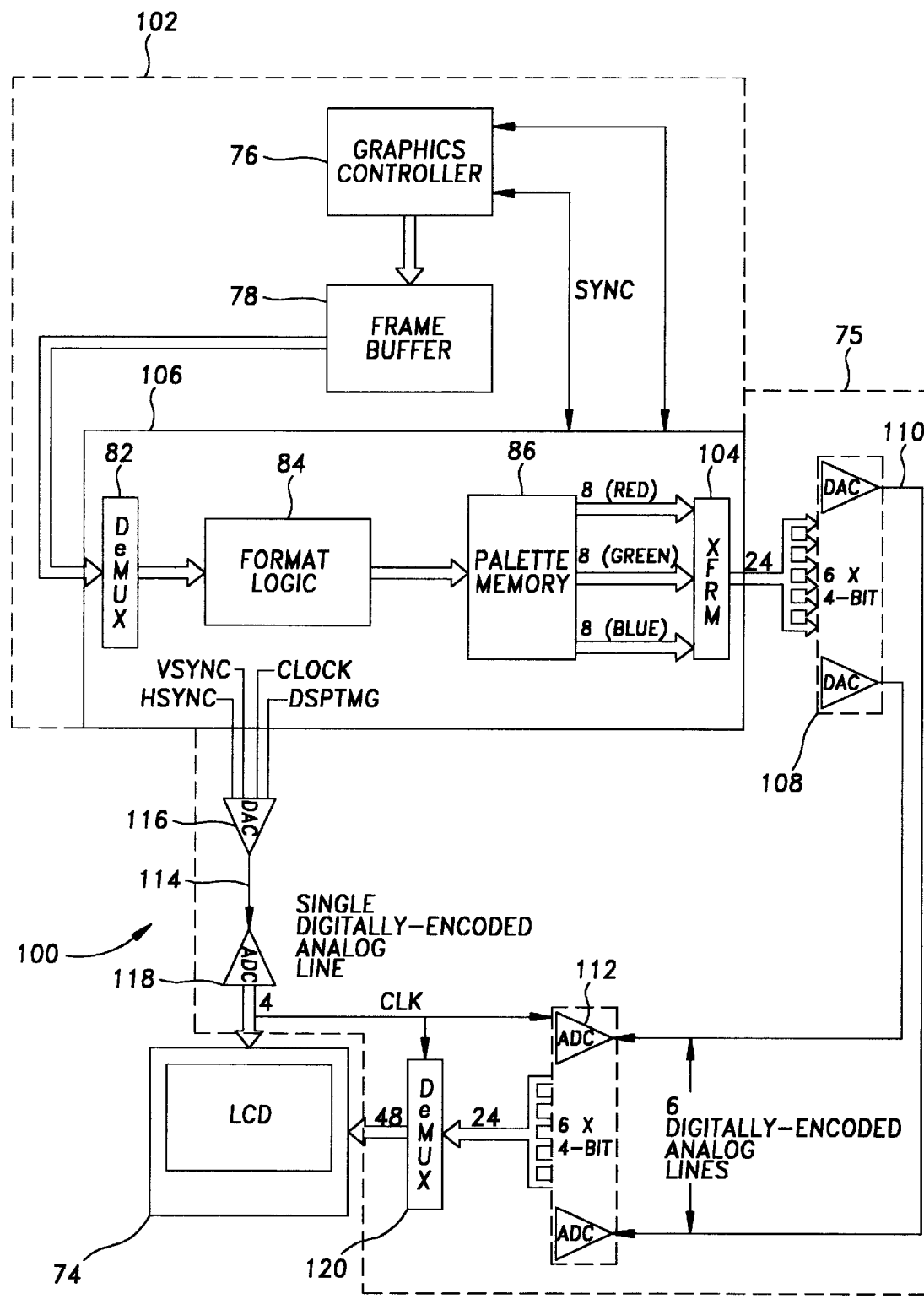
FIG. 5 is a second embodiment of the present invention.

FIG. 5 shows a second embodiment of the present invention wherein the interface between the graphics system and the LCD monitor is accomplished using only seven lines, thereby enabling the graphics system to LCD monitor connection to be implemented with a standard 15 pin "D-shell" CRT connector. System 100 comprises a computer graphics system 102 and LCD monitor 74 identical to that shown in the system of FIG. 3, except that transform circuit 104 in palette/transformation circuit 106 outputs a 24 bit, rather than 48 bit, digital video signal. The 24-bit digital data signal is fed into the inputs of six four-bit DACs 108 and digitally encoded onto six analog signals 110.

The system 100 may be modified to accommodate palette memories which provide more or less than 8 bits of digital video data per color. For example, if 4 or less bits are provided, then only three DACs 108 and three corresponding analog video signals 110 may be utilized. The disclosed scheme for interleaving of data bits onto the input lines of the DACs 108 (see FIG. 4) also provides for simple backward modification of the circuitry to less than 8 bits per color and simple forward modification to more than 8 bits per color.

For example, if 6 bits of color were provided, the three even bits would be encoded by a first DAC in the pair and the three odd bits would be encoded by a second DAC in the pair. Each DAC would be capable of outputting $2^3$ or 8 analog levels. If 10 bits of color were provided, the five even bits would be encoded by a first DAC in the pair and the five odd bits would be encoded by a second DAC in the pair. Each DAC would be capable of outputting $2^5$ or 32 analog levels. Still assuming a 1 volt analog signal, the difference between voltage levels would be 1 volt/32 levels or 31.25 millivolts (mV), which still provides excellent noise immunity compared to the system of FIG. 2.

At the display end of the analog signals 110, complementary analog-to-digital converters (ADCs) 112 are used to reconstruct the original digital information. The six digitally encoded analog signals are converted back to the original 24 digital data signals. As compared to the ADCs 92 in FIG. 3, the ADCs 112 are higher speed devices (e.g. 120 megahertz (MHz) BiCMOS II devices), suitable for 1280×1024 pixel workstation displays. The 24 bit-data signal output by ADCs 112 is demultiplexed using the clock signal and demultiplexer 120 to provide a 48 bit video data signal suitable for input into the LCD display monitor 74.

The four digital display synchronization signals (HSYNC, VSYNC, clock, and DSPTMG) are similarly encoded onto a single analog signal 114 by DAC 116. A complementary analog-to-digital converter (ADC) 118 is used to reconstruct the original digital information provided by the digital display synchronization signals, by converting the single digitally encoded analog signal 114 back to the original 4 digital synchronization signals.

As shown in both disclosed embodiments of the invention in FIGS. 3 and 5, the output of the graphics system to a display monitor interface is a 48 bit digital data video signal and a 4 bit synchronization signal. Accordingly, the interface may be used in any existing LCD computer system, such as the one shown in FIG. 2.

In addition, the disclosed graphics system to display monitor interface of FIG. 5 may be used to connect a graphics system to a CRT monitor, as well as an LCD monitor. Both CRT and LCD display video signals are on the order of 1 volt. Moreover, because both CRT and LCD applications will require DACs on the graphics system end of the interface, DACs 108 are used in either application. In the CRT application, however, ADCs 112 and demultiplexer 120 are replaced by the standard CRT "D-shell" connector.

The six digitally encoded analog video signals 110 and the single digitally encoded analog synchronization signal 114 are connected to seven of the "D-shell" connector pins. Specifically, the seven lines are connected to the three video pins (30a–c), the HSYNC and VSYNC lines (32, 34), and two of the four monitor identifier lines 36a–36d (refer back to FIG. 1). The remaining two monitor identifier lines may be used for bi-directional communications between the display and the computer graphics system, providing the ability to connect input/output (I/O) devices (e.g. a keyboard or mouse) to the graphics system at the location of the display, or to provide bi-directional audio capabilities at the location of the display.

Thus, the encoding/decoding display-to-graphics system interface provided by the present invention may be used for both LCD and CRT systems. Accordingly, it therefore possible to permit simultaneous display on both an LCD and a CRT display if desired. Alternatively, existing CRT displays may be replaced with an LCD display using the same connector. Therefore, the same industry-standard interconnection medium may be used to connect the graphics system to the LCD or CRT display. Graphics system software can be programmed to query the four monitor identifier lines to determine whether a CRT or LCD display monitor is present, and respond accordingly.

Accordingly, the preferred embodiment of a method and system for multiplexing and demultiplexing video signals for graphic display monitors in computer systems has been described. With the foregoing description in mind, however, it is understood that this description is made only by way of example, that the invention is not limited to the particular embodiments described herein, and that various rearrangements, modifications and substitutions may be implemented without departing from the scope of the invention as hereinafter defined by the following claims and their equivalents.

We claim:

1. A computer graphics and display system, comprising:
a graphics system for outputting a first plurality of digital color signals;
a first digital-to-analog converter (DAC) for converting said first plurality of digital color signals into a second plurality of analog color signals, said second plurality being less in number than said first plurality;
an interconnection medium for conveying said second plurality of analog color signals;
a first analog-to-digital converter (ADC) for receiving and reconverting said second plurality of analog color signals back to said first plurality of digital color signals; and
a display device for receiving said reconverted first plurality of digital color signals.

2. The system of claim 1, wherein said display device is a liquid crystal display (LCD) device.

3. The system of claim 2, further comprising:
a third plurality of digital display synchronization signals output by said graphics system;
a second DAC for converting said third plurality of digital display synchronization signals into a single analog synchronization signal; and
a second ADC for reconverting said single analog synchronization signal back to said third plurality of digital display synchronization signals.

4. The system of claim 3, wherein said synchronization signals comprise at least a horizontal synchronization signal, a vertical synchronization signal, a display timing signal, and a clock signal.

5. The system of claim 2, wherein said first and second DACs are comprised of at least one four-to-one (4–1) bit DAC, and said first and second ADCs are comprised of at least one one-to-four (1–4) bit ADC.

6. The system of claim 1, wherein said display device is a cathode ray tube (CRT) device.

7. The system of claim 5, wherein said first plurality of digital color signals is forty-eight, said second plurality of analog color signals is twelve and said third plurality of digital display synchronization signals is four.

8. The system of claim 5, wherein said first plurality of digital color signals comprises red, blue and green even pixels and red, blue and green odd pixels, each color for both even and odd pixels encoded onto a single pair of said first DACs by interleaving same color pixels onto said single pair.

9. The system of claim 5, further comprising a demultiplexer for demultiplexing said reconverted first plurality of digital color signals prior to being input to said LCD device.

10. The system of claim 9, wherein said first plurality of digital color signals is twenty-four, said second plurality of analog color signals is six and said third plurality of digital display synchronization signals is four.

11. An interface device for connecting a display device to a computer graphics system which outputs a first plurality of digital color signals, said interface device comprising:
a first digital-to-analog converter (DAC) for converting the first plurality of digital color signals into a second plurality of analog color signals, said second plurality being less in number than said first plurality;
an interconnection medium for conveying said second plurality of analog color signals;
a first analog-to-digital converter (ADC) for (i) receiving and reconverting said second plurality of analog color signals back to the first plurality of digital color signals, and (ii) outputting said reconverted first plurality of digital color signals to the display.

12. The system of claim 11, wherein said display device is a liquid crystal display (LCD) device.

13. The system of claim 12, further comprising:
a third plurality of digital display synchronization signals output by said graphics system;
a second DAC for converting said third plurality of digital display synchronization signals into a single analog synchronization signal; and
a second ADC for reconverting said single analog synchronization signal back to said third plurality of digital display synchronization signals.

14. The system of claim 13, wherein said synchronization signals comprise at least a horizontal synchronization signal, a vertical synchronization signal, a display timing signal, and a clock signal.

15. The system of claim 12, wherein said first and second DACs are comprised of at least one four-to-one (4–1) bit DAC, and said first and second ADCs are comprised of at least one one-to-four (1–4) bit ADC.

16. The system of claim 11, wherein said display device is a cathode ray tube (CRT) device.

17. The system of claim 15, wherein said first plurality of digital color signals is forty-eight, said second plurality of analog color signals is twelve and said third plurality of digital display synchronization signals is four.

18. The system of claim 15, wherein said first plurality of digital color signals comprises red, blue and green even pixels and red, blue and green odd pixels, each color for both even and odd pixels encoded onto a single pair of said first DACs by interleaving same color pixels onto said single pair.

19. The system of claim 15, further comprising a demultiplexer for demultiplexing said reconverted first plurality of digital color signals prior to being input to said LCD device.

20. The system of claim 19, wherein said first plurality of digital color signals is twenty-four, said second plurality of analog color signals is six and said third plurality of digital display synchronization signals is four.

* * * * *